US006181955B1

United States Patent
Dartois (10) Patent No.: US 6,181,955 B1
(45) Date of Patent: Jan. 30, 2001

(54) METHOD OF TRANSMITTING A CONTROL SIGNAL BY A BASE STATION OF A DIGITAL CELLULAR MOBILE RADIO SYSTEM AND A CORRESPONDING BASE STATION

(75) Inventor: Luc Dartois, Carrieres Sous Poissy (FR)

(73) Assignee: Alcatel, Paris (FR)

( * ) Notice: Under 35 U.S.C. 154(b), the term of this patent shall be extended for 0 days.

(21) Appl. No.: 09/227,884

(22) Filed: Jan. 11, 1999

(51) Int. Cl.[7] .................................................... H04B 1/38
(52) U.S. Cl. ............................ 455/562; 455/434; 342/368
(58) Field of Search .................................... 455/561, 562, 455/422, 443, 517, 524–525, 434; 342/368, 359, 373–374

(56) References Cited

U.S. PATENT DOCUMENTS

| 5,272,484 | 12/1993 | Labaar . | |
|---|---|---|---|
| 5,479,177 | 12/1995 | Rudish et al. . | |
| 5,561,850 | * 10/1996 | Makitalo et al. | 455/506 |
| 5,596,333 | * 1/1997 | Bruckert | 455/522 |
| 6,070,090 | * 5/2000 | Feuerstein | 455/560 |

FOREIGN PATENT DOCUMENTS

| 2 646 563 A1 | 11/1990 | (FR) . |
| 2 281 007 | 2/1995 | (GB) . |
| 2 295 524 | 5/1996 | (GB) . |
| 2 317 786 | 4/1998 | (GB) . |

* cited by examiner

*Primary Examiner*—Doris H. To
(74) *Attorney, Agent, or Firm*—Sughrue, Mion, Zinn, Macpeak & Seas, PLLC (57) ABSTRACT

The invention concerns a method of transmitting a control signal by a base station of a digital cellular mobile radio system, said base station comprising at least one array of a plurality of antennas for dynamically creating a beam (31) transmitting said control signal, said transmit beam (31) being adapted to assume different angular positions (33) within a predetermined angular range (32). In accordance with the invention, said method includes a step of allocating to said control signal, in at least one of said transmit subsystems, a predetermined specific time shift so that said transmit beam (31), called a vibrating beam (31), assumes in succession at least some (33) of said different angular positions and enables isotropic broadcasting of said control signal in said angular range (32). The invention also concerns a corresponding base station.

17 Claims, 7 Drawing Sheets

METHOD OF TRANSMITTING A CONTROL SIGNAL BY A BASE STATION OF A DIGITAL CELLULAR MOBILE RADIO SYSTEM AND A CORRESPONDING BASE STATION

BACKGROUND OF THE INVENTION

The field of the invention is that of digital cellular mobile radio systems.

To be more precise, the invention concerns a method of transmitting a control signal by a base station of a digital cellular mobile radio system and a corresponding base station.

The invention applies in particular, but not exclusively, to transmitting BCCH signals in mobile radio systems of the following types: GSM 900 (Global System for Mobile communications operating in the 900 MHz band), DCS 1800 (Digital Cellular System operating at 1800 MHz) or PCS 1900 (Personal Communication System).

A digital cellular mobile radio system is usually implemented within a network of geographical cells through which mobile stations move. A base station is associated with each cell and a mobile station communicates via the base station associated with the cell in which it is located.

Each base station uses a number of signals (also called carriers) at predetermined frequencies on the downlink (from the base station to the mobile stations). One of these signals, called the BCCH (Broadcast Control Channel) signal, is a control signal carrying in particular (generally in the first time slot of each frame) a broadcast control channel BCCH specific to the cell and supplying all mobile stations with general information about the network and information about the broadcasting cell and adjacent cells.

The problem addressed here is transmission of the BCCH signal or more generally of any control signal by the base station. Because all of the cell must be covered, transmission of the signal must comply with a number of constraints. First of all, it must be isotropic (or quasi-isotropic). Also, it must be effected at a sufficiently high power, continuously and at a fixed frequency.

For the above constraints to be complied with, the BCCH signal is conventionally transmitted by an omnidirectional antenna associated with a power amplifier.

However, proposals have been made to replace omnidirectional antennas with antenna arrays in order to increase the size of cells and/or reduce base station transmit power levels. Antenna arrays of this kind form beams dynamically and therefore optimize use of resources.

Initially, only traffic signals have benefited from being transmitted on beams. In other words, each base station has had one or more antenna arrays for transmitting traffic signals and has retained an omnidirectional antenna for transmitting the BCCH signal. The constraints that transmission of the BCCH signal has to comply with are such that for a long time it has been thought that only an omnidirectional antenna could be used.

However, more recently, proposals have been made to transmit the BCCH signal using one or more antenna arrays. The number of antenna arrays is generally directly related to the number of sectors that the cells comprises, one antenna array covering each sector.

Patent document WO/9617486 proposes a base station comprising means for forming a plurality of fixed beams, each covering a part of the cell, and means for assigning the BCCH signal to each of the fixed beams in succession. In this way, transmission of the BCCH signal corresponds to coverage of the cell by cyclic scanning. The above document recommends that the BCCH signal is transmitted in each beam for the duration of one time slot of the frame structure. In this way each beam receives the BCCH signal every N time slots where N is the total number of beams.

The solution proposed in the above patent document is not satisfactory.

First of all, although the BCCH signal is transmitted isotropically, this cannot be considered to be true broadcasting because of the long interval (N time slots) between two transmissions on the same beam.

What is more, because of this long interval, it is difficult for a mobile station to maintain accurate knowledge of the better adjoining base stations. Also, the mobile station may have moved between two successive pointings in its direction, which increases the probability of loss of the BCCH signal and the complexity of handover between sectors and/or between cells.

SUMMARY OF THE INVENTION

An object of the present invention is to overcome the various drawbacks of the prior art.

To be more precise, one object of the present invention is to provide a method of transmitting a control signal by a base station of a digital cellular mobile radio system which optimizes the necessary transmission resources.

Another object of the invention is to provide a method of the above kind which reduces manufacture and maintenance costs.

Another object of the invention is to provide a method of the above kind which broadcasts the control signal substantially isotropically.

Another object of the invention is to provide a method of the above kind retaining all the advantages associated with beam forming (reduced interference, reduced power and/or cell size, etc.).

The above objects, and others that become apparent below, are achieved in a preferred first implementation of the invention by a method of transmitting a control signal by a base station of a digital cellular mobile radio system, said base station comprising at least one array of a plurality of antennas for dynamically creating a beam transmitting said control signal, said transmit beam being adapted to assume different angular positions within a predetermined angular range, a plurality of transmit subsystems being associated with said plurality of antennas, each transmit subsystem including phase modulator means and phase-shifter means, each antenna transmitting a signal supplied by an associated one of said transmit subsystems on the basis of said control signal and contributing to the creation of said beam, which method is characterized in that it includes the following step:

allocating to said control signal, in at least one of said transmit subsystems, a predetermined specific time shift so that said transmit beam, called a vibrating beam, assumes in succession at least some of said different angular positions and enables isotropic broadcasting of said control signal in said angular range.

Thus this first embodiment of the invention forms a beam that vibrates (i.e. takes different angular positions) quickly, at the phase modulation rate of the signal.

Note that this vibration is smoothed by the demodulators and channel decoders of the terminals.

A conventional beam does not vibrate and points in a fixed angular direction. The time shift introduces into one or more transmit subsystems an additional phase-shift of the signals supplied thereby. This additional phase-shift induces the required variation in the direction of the beam. The additional phase-shift must be small enough to prevent any cancellation through addition of signals from the transmit subsystems transmitted by the antennas. Avoiding cancellation of the transmitted signal enables power summing of the signals generated using different time shifts.

Time shift means either a time-delay or a time-advance.

The time shift can be applied before, during or after phase modulation, but before any conversion into the analog domain.

The isotropic effect of the vibration stems from the random nature of the phase modulation bits. Isotropic broadcasting is accentuated in the event of encoding (encryption and/or encipherment). The vibration rate is directly related to the phase modulation rate.

Note that the control signal is broadcast better with the vibrating beam than conventionally with an omnidirectional antenna. The vibration reduces fading phenomena because of overlap between the various angular positions adopted by the vibrating beam.

Introducing a time shift represents a virtually zero cost. Operating in the digital domain, it is sufficient to select certain samples from a plurality of samples.

The invention benefits from all the advantages associated with beam forming by an antenna array.

The difference between two time shifts assigned to two transmit subsystems associated with two adjacent antennas is advantageously equal to a fixed predetermined basic time shift dT.

This shift is, for example, such that the phase difference between the two outputs of two transmit subsystems associated with two adjacent antennas is equal to a few tens of degrees when a significant phase skip or rotation occurs, for example from 60° to 90° between two successive bits of the modulating signal (i.e. the control signal in the present instance).

Since said beam is being created by N antennas associated with N transmit subsystems, each of said N transmit subsystems is preferably allocated one of a plurality of N time shifts uniformly distributed across a predetermined number n of bit periods.

This feature encourages regular time shifts between two consecutive signals. The phase differences relative to the amplitude of the vibration induced between two vibrating beams are consequently the same width.

In a preferred embodiment of the invention each predetermined time shift specific to one of said transmit subsystems is a predetermined fraction of a bit period.

Accordingly, since the shifts are very small compared with the bit period of the phase modulation, for example because GMSK (Generalized Minimum Shift Keying) modulation is employed, they guarantee a phase shift between the signals such that their sum is non-zero.

This enables substantially isotropic broadcasting of the control signal as seen from a mobile station in the angular range defined by the resulting vibrating beam. Also, a technique of the above kind significantly reduces the effect of directional fading as seen from the mobile station.

Said time shifts are advantageously distributed on both sides of a time reference specific to said base station.

This prevents skew in the estimate of the time reference made by the mobile stations. It also shifts the phase of the vibrating beam either side of a fixed mean angular direction.

In a second preferred embodiment of the invention said method comprises the following steps:

defining at least two sets of antennas from said plurality of antennas of said array;

associating a set of separate transmit subsystems with each set of antennas, one transmit subsystem per antenna; and allocating to each set of transmit subsystems a separate set of phase-shift coefficients corresponding to a particular angular position of said beam, each coefficient of said set defining the phase-shift effected by the phase-shifter means of one of the transmit subsystems of said set;

so that each of said sets of antennas dynamically creates a transmit beam in a respective average angular direction, the superposed beams created by the various sets of antennas having different phases.

The second embodiment of the invention therefore consists in superimposing a plurality of beams to broadcast the control signal in a wider angular range.

Each beam has its respective mean angular direction.

Clearly not only a set of phase coefficients but also a set of specific amplitude coefficients are used to produce each beam.

Equally clearly, any one antenna can be part of a plurality of separate sets of antennas, and can therefore transmit a plurality of signals, each supplied by a separate transmit subsystem, and contributing to the creation of a plurality of beams.

Said method advantageously further comprises the following step for at least one of said sets of transmit subsystems:

allocating to said control signal, in at least one of said transmit subsystems, a predetermined specific time shift so that said transmit beam, called a vibrating beam, created by the set of antennas associated with said set of transmit subsystems assumes in succession at least some of said different angular positions and enables isotropic broadcasting of said control signal around said angular direction specific to said vibrating beam.

This combines the features of the first and second embodiments by having at least one of the superposed beams vibrate. This technique provides even better coverage.

The number of antennas forming parts of at least two separate sets of antennas is advantageously minimized.

This reduces the variation of power between the antennas and the constraints on the ratings of the power amplifiers used in the transmit subsystems.

All the superposed beams preferably have substantially the same width and the mean angular directions of two adjacent superposed beams are preferably shifted by substantially said beam width.

The beams therefore assume side-by-side positions. The isotropic coverage is improved if the beams vibrate.

Said antenna array is advantageously part of the group comprising coplanar antenna arrays and non-coplanar antenna arrays.

Note that if the array is of the non-coplanar type the time shifts and the phase-shifts that apply to the transmit subsystems are modified in accordance with the topology and the geometry of the antenna array. This applies in particular to a polygonal array with axial symmetry which can cover 360° on its own. In this case, no sectoring of the base station is necessary.

Said base station is preferably of the type comprising at least two antenna arrays each covering a separate angular sector.

Each antenna array is preferably of the coplanar type with the antennas of each array equally spaced by a distance of less than half the wavelength at the maximum frequency used in the angular sector covered by said array.

Said antenna array is advantageously also used to transmit at least one traffic signal using a technique superposing and/or adding signals in at least some transmit subsystems.

This optimizes the use of available transmission resources. In the case of a narrow beam, a traffic signal is a combination in phase and in amplitude of the same basic signal transmitted by each antenna of the array.

Said digital cellular mobile radio system is preferably part of the group comprising space-division multiple access systems and spatial filtering systems.

In other words, the invention applies whether or not the system provides simultaneous access to a plurality of terminals at the same channel frequency.

Whether it is of the SDMA (Space-Division Multiple Access) or SFIR (Spatial Filtering) type, the system can also employ one of the following techniques: Frequency-Division Multiple Access, Time-Division Multiple Access, Code-Division Multiple Access or a combination of those techniques.

In a preferred embodiment of the invention said control signal is a BCCH signal specific to said base station.

The invention also concerns a base station implementing the above first embodiment of the method. Said base station comprises means for allocating to said control signal, in at least one of said transmit subsystems, a predetermined specific time shift so that said transmit beam, called a vibrating beam, assumes in succession at least some of said different angular positions and enables isotropic broadcasting of said control signal in said angular range.

In an advantageous variant corresponding to the second embodiment of the method described above, said base station comprises:

at least two sets of antennas from said plurality of antennas of said array;

at least two separate transmit subsystems each associated with one of said sets of antennas, one transmit subsystem per antenna; and means for allocating to each set of transmit subsystems a separate set of phase-shift coefficients corresponding to a particular angular position of said beam, each coefficient of said set defining the phase-shift effected by the phase-shifter means of one of the transmit subsystems of said set;

so that each of said sets of antennas dynamically creates a transmit beam in a respective average angular direction, the superposed beams created by the various sets of antennas having different phases.

BRIEF DESCRIPTION OF THE DRAWINGS

Other features and advantages of the invention become apparent on reading the following description of three preferred embodiments of the invention given by way of illustrative and non-limiting example only, and from the accompanying drawings, in which.

DETAILED DESCRIPTION OF THE INVENTION

The invention therefore concerns a method of transmitting a control signal by a base station of a digital cellular mobile radio system and a base station implementing that method.

In the remainder of the description of the invention the control signal is the BCCH signal of the GSM standard, for example.

A base station as considered here is of the type comprising at least one antenna array capable of forming a beam for transmitting a traffic signal. The transmit beam can occupy various angular positions within a predetermined angular range, for example 120°. In this case the cell is divided into three sectors and the associated base station therefore has three antenna arrays to cover the cell.

It is assumed that the base station uses a plurality of traffic signals.

Each antenna of the antenna array is conventionally driven by an associated transmit subsystem. Each transmit subsystem includes phase modulator means and phase-shifter means.

To optimize the use of existing resources, each antenna array is re-used to create a beam for transmitting a control signal.

The antenna array used can be coplanar or non-coplanar. In the case of a coplanar antenna array the antennas are equally spaced at a distance less than half the wavelength at the maximum frequency used in the angular sector covered by the array.

A first embodiment of the method in accordance with the invention of transmitting a control signal is described with reference to FIG. 1.

This first embodiment of the method in accordance with the invention is based on applying a specific predetermined time shift to the control signal in at least one of the transmit subsystems. This produces a so-called "vibrating" beam which assumes at least some different angular positions in succession. This vibration of the beam leads to substantially isotropic broadcasting of the control signal in the angular range between the extreme positions that the beam can occupy.

In this first embodiment, the method comprises:

in the first embodiment of the present invention, a step 11 of applying to the control signal a specific predetermined time shift in at least one of the transmit subsystems of the antenna array;

conventionally: a conversion step 12 specific to each type of signal. This step is therefore effected independently for the traffic signals and the control signal and comprises, for each transmit subsystem:

- a step 121 for multicarrier phase modulation of the control signal and the traffic signals;
- a step 122 for multicarrier amplitude modulation of the traffic signals and the control signal;
- a step 123 for shifting the phase of each control signal allocated to a transmit subsystem so that, for example in the case of a coplanar array of antennas equally spaced by a distance d, each subsystem i is subject to a phase-shift $d\phi_i$ after a modulation step of the following form: $d\phi_i = d\phi_0 * i$, with $d\phi_0 = (2*\pi*d*\sin(\theta))/L$ where $\theta$ corresponds to the required mean angular direction of the vibrating beam measured algebraically relative to the mid-perpendicular of the plane of the antenna array and L is the wavelength corresponding to the center frequency used by the transmitted control signal;
- a step 124 for summing the contributions of the traffic signals and the control signal to the various carriers;

a digital-to-analog conversion step 13;

a transmit mixing step 14 for transposing the traffic signals and the control signals in each transmit subsystem and initially in the base band to the radio frequency; a common frequency reference is first distributed in phase to each transmit subsystem so that all the transmit subsystems are coherent;

an amplification step 15 for applying power amplification to the traffic signals and the control signal in each transmit subsystem; and a transmitting step 16 in which each antenna transmits the control signal and the traffic signals with its own specific phase and amplitude.

Clearly, multicarrier phase modulation step 121 and multicarrier amplitude modulation step 122 can be effected simultaneously, for example using a DSP (Digital Signal Processor).

Note that conversion step 12, digital-to-analog conversion step 13, transmit mixing step 14, amplification step 15 and transmission step 16 are executed conventionally to create a beam for transmitting traffic signals.

In a variant of the invention, the conversion step 12 can be interchanged with the time shift allocation step 11.

Figure 3:
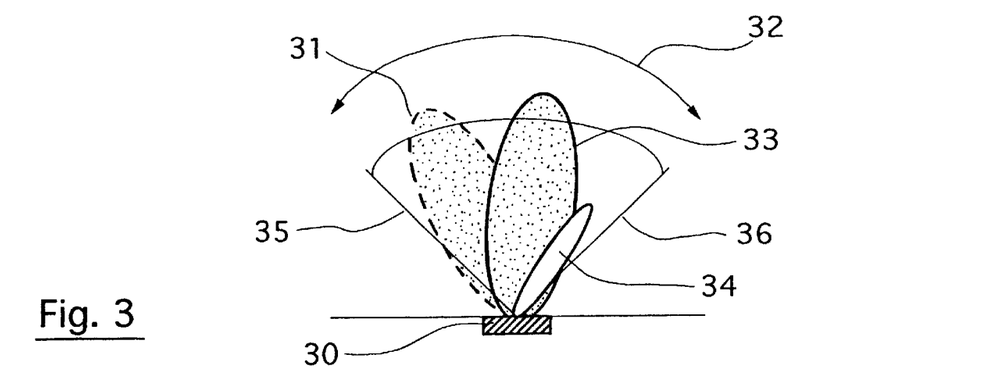
FIG. 3 is a simplified diagram of a vibrating beam generated by the base station from FIG. 2.

Accordingly, in accordance with the invention, the beam for transmitting the control signal vibrates (see FIG. 3 described hereinafter). In other words, the beam occupies successive different angular positions within the angular range associated with the antenna array at a timing rate imposed by that of the phase modulation bits. Because the phase modulation bits are random, these various positions are occupied at random. Any encoding (encryption and/or encipherment) applied at the time of modulation accentuates the random nature of the various positions occupied. The coverage generated corresponds to substantially isotropic broadcasting.

The faster the vibration, the more isotropic the broadcasting, as seen from the mobile stations.

The vibration rate of the beam depends on the modulation rate. If the modulation rate is higher, the system comprising the equalizer, the demodulator, and the channel decoder of a mobile station in the transmit area of the vibrating beam smoothes the vibration effect. In substance, it does not have time to establish a difference between two successive positions of the vibrating beam.

Accordingly the time spread of the composite signal transmitted by the antenna array of a base station behaves, as seen by the mobile stations, like a diversity of additional paths which add to that of the propagation channel. The equalizer-demodulator-decoder system of the mobile station captures the various paths and treats them in the same fashion within the limits of the equalization time window. This feature can be used with advantage for relatively small cells. The mobile stations have a wide equalization margin because the channel is dispersed over a short time period compared to the worst case scenario for large rural cells, for which the mobile stations are rated. In an urban/suburban area this margin improves system capacity by traffic channel beam formation.

The basic time-delay dT is the modulation time-delay between two transmit subsystems corresponding to two adjacent antennas. The basic time-delay dT is chosen so that the equalizer does not lose the control signal. To this end the basic time-delay dT is, for example, such that the induced phase difference is in the order of a few tens of degrees when there is a phase skip or rotation, for example 60° to 90°, between two successive bits of the modulating signal. A basic time-shift dT equal to a fraction of a bit period is advantageous.

For a beam created by four antennas associated with four transmit subsystems, for example, each of the four transmit sub-systems can be allocated a time shift from four time shifts uniformly distributed across two bit periods (i.e. the following four shifts: $-(\frac{3}{4})*T_{bit}$; $-(\frac{1}{4})*T_{bit}$; $+(\frac{1}{4})*T_{bit}$; $+(\frac{3}{4})*T_{bit}$, where $T_{bit}$ is the modulation bit period). The number of bit periods over which the time shifts are distributed is preferably less than the capacity of the equalizer of the mobile station. The equalizer can then also concern itself with traffic channels.

To balance the phase differences due to the vibration of the beam about the required mean angular direction, the time shifts are distributed on both sides of a time reference specific to the base station. This prevents skew in the estimate of the time reference made by the mobile stations. This balanced distribution feature can be used to process cell and/or sector handovers of the same cell using the control signal transmission method of the invention.

The method of the invention distributes the control signal to a plurality of antennas and therefore reduces the necessary power. In terms of amplification, the contribution is reduced by the following value: $10*\log_{10}(n)$, where n is the number of antennas used to transmit the control signal. With n=4 the power gain is therefore 6 dB.

The method of the invention also significantly reduces fading areas.

Note that using the method of the invention does not necessitate any modification to the hardware of the mobile stations. Only minor modifications are required at the base station. Step 11 of allocating a time shift to the modulated control signal merely amounts to recovering a selection of certain samples of the digital modulation used.

Figure 1:
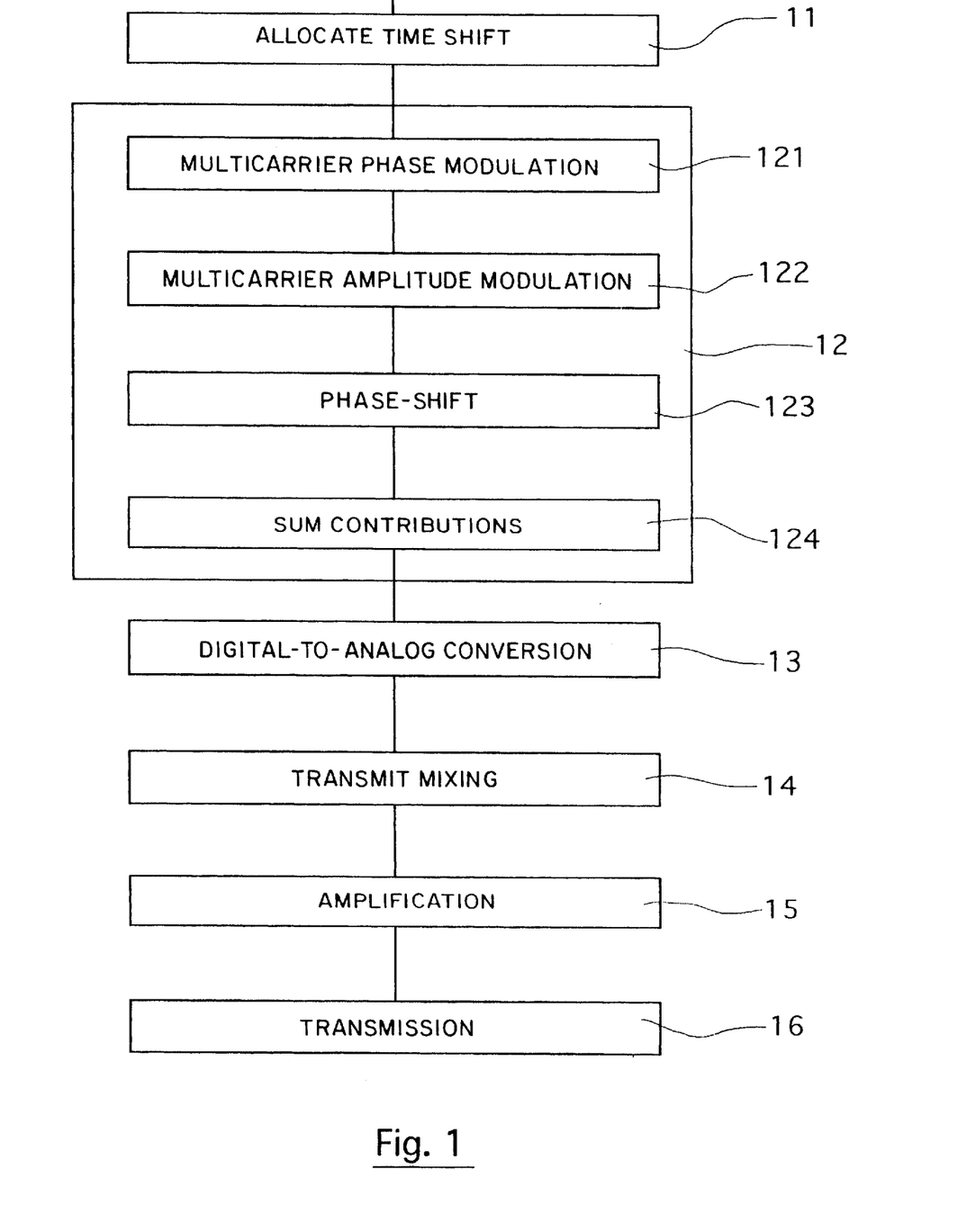
FIG. 1 is a simplified flowchart of a particular first embodiment of the method in accordance with the invention for transmitting a control signal by a base station of a radio communication system.
Figure 2A:
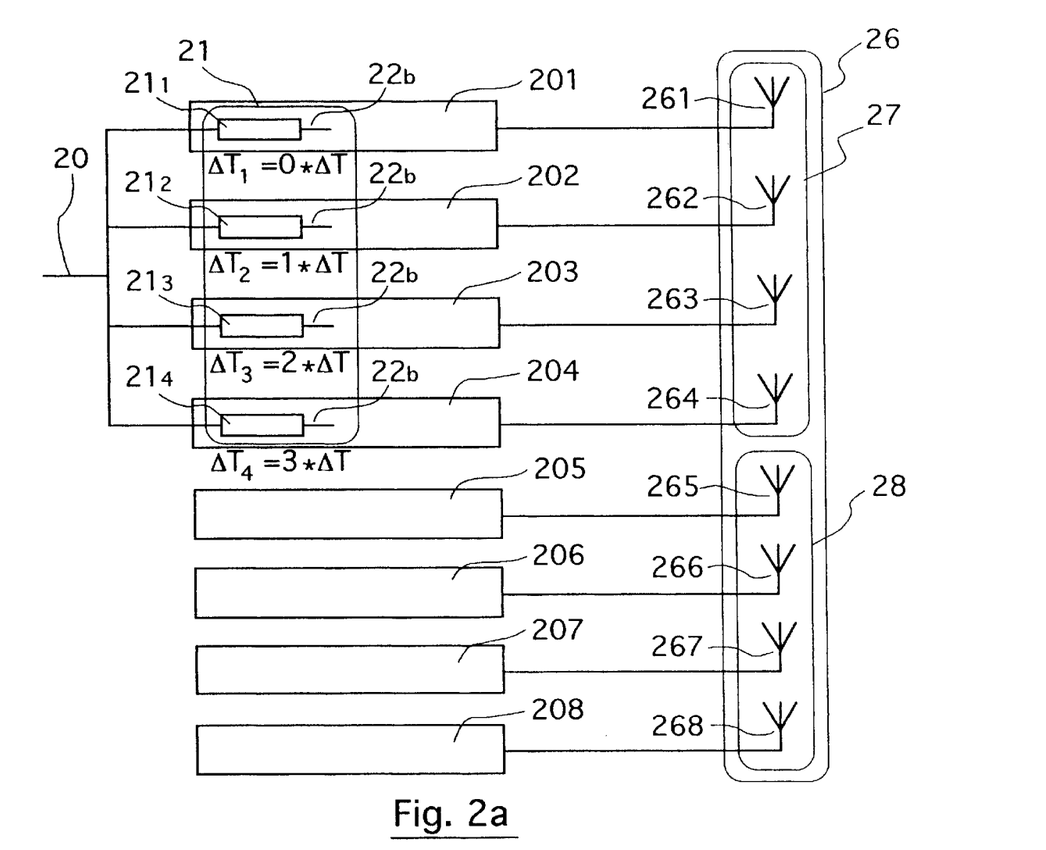
FIG. 2a is a simplified diagram of a particular first embodiment of a base station in accordance with the invention implementing the method of FIG. 1.

A first embodiment of a base station in accordance with the invention implementing the method of FIG. 1 is described with reference to FIG. 2a.

In this first embodiment the base station comprises means 21 for allocating a time shift to a control signal 20 in at least one transmit subsystem 201 to 204. For simplicity the traffic channels are not shown.

Clearly not all the transmit subsystems 201 to 208 are necessarily affected by the time shift of the control signal. The transmit subsystems 204 to 208 that are not affected can be reserved for processing traffic signals.

The means 21 for allocating a time shift are fed with the control signal 20 and apply to it a different time shift for each transmit subsystem. For example, the means $21_1$, $21_2$, $21_3$, $21_4$ for allocating a time shift to the transmit subsystems 201 to 204 respectively apply to the control signal the following time shifts: $\Delta T_1$; $\Delta T_2$; $\Delta T_3$; $\Delta T_4$. The means 21 for allocating a time shift to the control signal 20 in the four transmit subsystems deliver a control signal 20 shift in time by a fraction of a modulation bit period. The resulting transmit beam therefore assumes at least some angular positions in succession at a rate related to that of the phase modulation, enabling substantially isotropic broadcasting of the control signal within a predetermined angular range.

Each antenna 261 to 268 conventionally transmits a signal supplied by the associated transmit subsystem and contributes to creating the beam for transmitting the traffic signals. In accordance with the invention, at least some antennas 27 also transmit the control signal. Clearly the antennas 261 to 268 can also be used to transmit only the control signal. Equally clearly, the antenna array can also be used for directional reception of signals transmitted by mobile stations. The antennas 27 transmit the control signal, shifted in time differently depending on which transmit subsystem 201 to 204 is used, to create a vibrating beam as shown in FIG. 3.

A transmit subsystem 205 of a type known per se and used in the various embodiments of a base station in accordance with the invention is described with reference to FIG. 2b.

A base station conventionally comprises, for each transmit subsystem, converter means 22, digital-to-analog converter means 23, transmit mixer means 24, amplifier means 25 and antennas 26 used to process the traffic signals. The converter means 22 conventionally comprise means 221 for allocating a set of phase-shift coefficients, phase-shifter means 222, multicarrier phase modulator means 223, means 224 for allocating a set of amplitude coefficients, multicarrier amplitude modulator means 225 and means 226 for summing the contributions of the various signals.

The converter means 22 of the transmit subsystems 205 to 208 (see FIG. 2a) are fed at a high bit rate only with the various traffic signals 22a for conveying data specific to calls in progress with mobile stations in the cell associated with the base station. The converter means 22 of the transmit subsystems 205 to 208 phase modulate and amplitude modulate the traffic signals 22a and/or phase-shift them and/or sum the contribution of the various traffic signals 22a. For this the phase-shifter means 222 phase-shift the traffic signals 22a using phase-shift coefficients supplied by the means 221 for allocating a set of phase-shift coefficients. The means 222 apply a relative phase-shift $d\phi_i$ between the various transmit subsystems 201 to 208 allowing for the topology of the antenna network employed. In this way the phase-shifter means 222 alleviate the differences due in particular to the distance between the various antennas of a coplanar antenna array.

Similarly, the multicarrier amplitude modulator means 225 amplitude modulate the traffic signals for the various transmit subsystems 201 to 208 using amplitude coefficients supplied by the means 224 for allocating a set of amplitude coefficients.

Also, the means 226 for summing the contributions of the various signals add the contributions of the various traffic signals 22a.

Figure 2B:
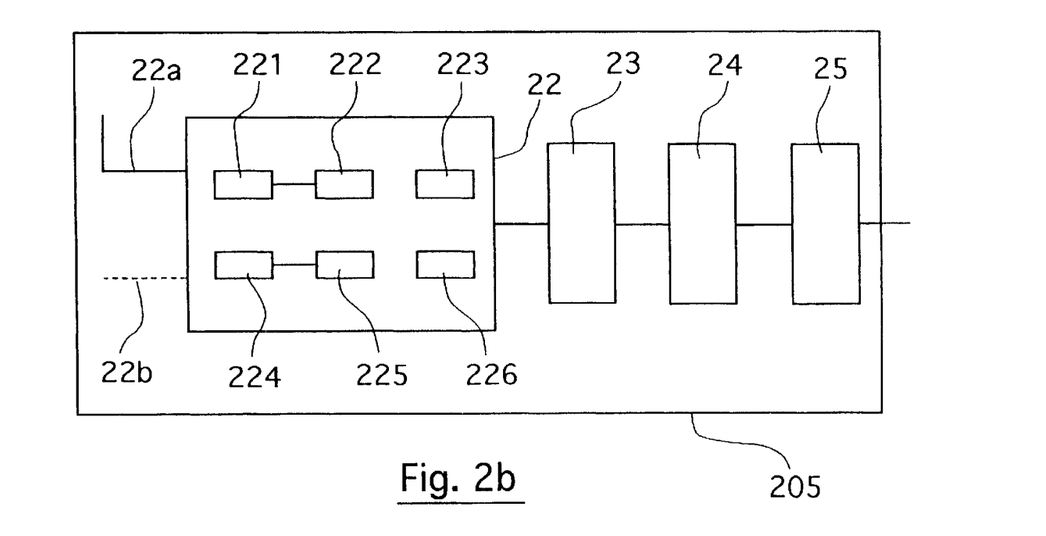
FIG. 2b is a simplified diagram of a transmit subsystem of a type known per se and used in the various embodiments of a base station in accordance with the invention.

The converter means 22 of the transmit subsystems 201 to 204 (see FIG. 2a) are, in accordance with invention, also fed with the time-shifted control signal $22_b$ (in dashed line in FIG. 2b).

The means 221 for allocating a set of phase-shift coefficients, the phase-shifter means 222, the multicarrier phase modulator means 223, the means 224 for allocating a set of amplitude coefficients, the multicarrier amplitude modulator means 225 and the means 226 for summing the contributions of the various signals can, in accordance with the invention, also process in accordance with the previously described technique the time-shifted control signal 22b for the transmit subsystems 201 to 204. In this way the converter means 22 of the transmit subsystems 201 to 204 deliver a time-shifted and converted signal to the digital-to-analog converter means 23.

The digital-to-analog converter means 23 are fed by transmit subsystems 201 to 208 with digital data concerning the converted traffic signals. The digital-to-analog converter means 23 of the transmit subsystems 201 to 204 are also fed with the time-shifted control signal converted by the converter means 22. The digital-to-analog converter means 23 convert the digital data received into analog data. The means 23 supply the traffic signals 22a in analog form to the transmit mixer means 24 for the transmit subsystems 201 to 208 and the time-shifted and converted control signal to the transmit subsystems 201 to 204.

The transmit mixer means 24 are fed with the converted traffic signals in analog form for the transmit subsystems 201 to 208 and with the control signal shift in time and converted for the transmit subsystems 201 to 204. At this stage such signals for the transmit subsystems 201 to 208 are in the base band. The transmit mixer means 24 convert the signals initially in the base band to the intermediate frequency or radio frequency. The transmit mixer means 24 supply the traffic signals to the amplifier means 25 for the transmit subsystems 201 to 208 and the time-shifted and converted control signal for the transmit subsystems 201 to 204, all at the radio frequency.

The amplifier means 25 amplify the traffic signals for the transmit subsystems 201 to 208 and the time-shifted and converted control signal for the transmit subsystems 201 to 204. Note that the power of the control signal must be such that the beam generated via the transmit subsystems 201 to 204 reaches the limits of the cell. The signals amplified by the amplifier means 25 are fed to the antennas 26 (see FIG. 2a).

A vibrating beam of this kind generated by the base station from FIG. 2 implementing the method of FIG. 1 is described with reference to FIG. 3.

An antenna array 30 conventionally creates a first beam 34 for transmitting a traffic signal. For each channel of the traffic signal the first beam 34 assumes a fixed position in an angular range 32 delimited by extreme positions 35 and 36.

In accordance with the invention, the antenna array 30 further creates a second beam 33 for transmitting the BCCH signal. The second beam 33 successively occupies a plurality of positions between the extreme positions 35 and 36. For simplicity only one other position 31 has been shown (in dashed line) in FIG. 3, in addition to the position 33. Clearly in reality the second vibrating beam 33 adopts numerous positions. The positions occupied by the beam 33 are random because the modulation bits are random and their timing depends on the phase modulation rate. Also, encoding (encryption and/or enciphering) accentuates the random nature of the positions occupied. This confers an isotropic nature on the coverage of the corresponding beam 33. The beam can for example vary ±60° over two bit periods, to cover a total sector of 120°.

The transmit power of the control signal is such that the second beam 33 has a length corresponding to the radius of the cells so that the vibration leads to complete coverage of a sector of the cell. Note that, the power being divided between a plurality of antennas, the power needed at each antenna is considerably reduced. Consequently, the cost relative to the transmit power is also reduced.

A second embodiment of the method for transmitting a control signal and of the base station in accordance with the invention is described with reference to FIGS. 4 to 6.

The second embodiment of the method of the invention consists in forming a plurality of independent beams $61_1$ to $61_8$ (see FIG. 6) each having a nominal power substantially equal to that of a traffic carrier. In other words, each antenna transmits a combination of a plurality of control signal carriers at the same frequency but with different phases as independent contributions to different beams.

Figure 4:
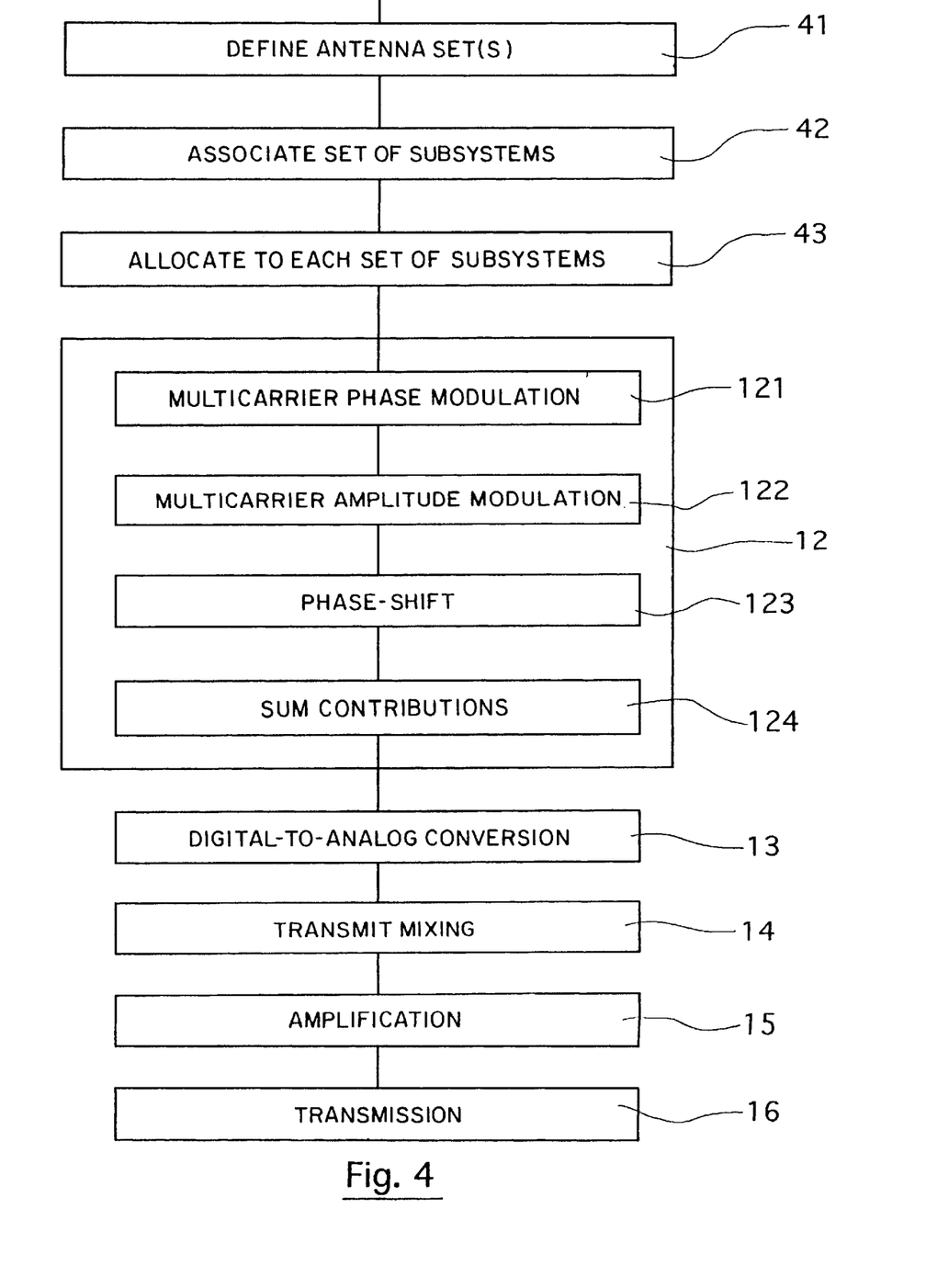
FIG. 4 is a simplified flowchart of a particular second embodiment of the method in accordance with the invention for transmitting a control signal by a base station of a mobile radio system.

The FIG. 4 flowchart shows that a few steps are common to the first and second embodiments, namely conversion step 12, digital-to-analog conversion step 13, transmit mixing step 14, amplifying step 15 and transmit step 16. The second embodiment differs from the first in that it comprises the following steps:

defining (41) at least two sets of antennas from the plurality of antennas of the array. Each set of antennas defined in this way is intended to form a beam specific to the control signal;

associating (42) a set of separate transmit subsystems with each set of antennas, one transmit subsystem per antenna; and allocating (43) to each set $\underline{i}$ of transmit subsystems a separate set of phase-shift coefficients $\Phi_{k,i}$ corresponding to a particular angular position of the beam. Each coefficient of the set defining the phase-shift $\Phi_{k,i}$ effected by the phase-shifter means 222 of one of the transmit subsystems $\underline{k}$ of the set $\underline{i}$ of transmit subsystems.

In this way each set of antennas dynamically creates a transmit beam in a respective mean angular direction. The superposed beams created by the various sets of antennas have different phases. Similarly, each set $\underline{i}$ of transmit subsystems can be allocated a separate set of amplitude coefficients $\rho_{k,i}$ corresponding to a particular amplitude of the associated beam. Each coefficient of the set defines the amplitude $\rho_{k,i}$ effected by the phase-shifter means 222 (see FIG. 2b). To cover a given sector it is therefore possible to superpose as many beams as necessary, each having a chosen width and amplitude.

The method further comprises a respective conversion step 12 for each type of signal (traffic or control) and itself comprising the conventional steps 121 to 124 explained for the first embodiment. However, in the second embodiment of the present invention, the sets of phase-shift coefficients $\Phi_{k,i}$ and amplitude coefficients $\rho_{k,i}$ are both operated on.

Clearly phase modulation step 441 and amplitude modulation step 442 can be executed simultaneously in a digital signal processor (DSP).

Clearly the power allocated to each antenna of a set of antennas is directly proportional to the number of antennas.

When each beam uses a number N (N=8 in this case) of adjacent subsystems, the P (P=2 in this case) beams can use some or all of the antennas of the antenna array. However, minimizing the number of antennas contributing to transmitting signals belonging to different beams reduces the power variation between the antennas and the constraints on the rating of the amplifier means used in the transmit subsystems. This leads to the use of a maximum number of antennas from the antenna array and consequently contributes to the homogeneous use of the amplifier means and of the antennas of the array that are used.

A second embodiment of a base station in accordance with the invention implementing the method of FIG. 4 is described with reference to FIG. 5.

A base station of the above kind conventionally comprises transmit subsystems $51_1$ to $51_8$ and $52_1$ to $52_8$ which in this example form two separate sets of transmit subsystems. Each of the transmit subsystems $51_1$ to $51_8$ and $52_1$ to $52_8$ conventionally comprises the same resources as the transmit subsystem 205 described with reference to FIG. 2b. Each set of transmit subsystems forms one beam. To simplify the figure only two sets of transmit subsystems are shown.

In accordance with the invention, the base station comprises at least one set 26 of antennas and at least two separate sets $51_1$ to $51_8$ and $52_1$ to $52_8$ of transmit subsystems, each associated with one of the sets 26 of antennas (one transmit subsystem per antenna). The allocator means 221 (see FIG. 2b) allocate each set $51_1$ to $51_8$ and $52_1$ to $52_8$ of transmit subsystems a set of phase-shift coefficients $\Phi_{k,i}$ where $\underline{k}$ is the number of the transmit subsystem in the separate set $\underline{i}$ of transmit subsystems $1 \leq k \leq N$ and $1 \leq i \leq P$, corresponding to a particular angular position of the beam. Each coefficient of the set defining the phase-shift effected by the phase-shifter means 222 of one transmit subsystem set $51_1$ to $51_8$ or $52_1$ to $52_8$ of the set.

In this way each of the sets 26 of antennas dynamically creates a transmit beam in a respective average angular direction (see FIG. 6 described hereinafter). The beams created by the different sets of antennas, which are called superposed beams, differ from each other in terms of their phase.

The phase-shift allocator means 221 (see FIG. 2b) deliver a set of phase-shift coefficients $\Phi_{k,i}$ to the phase-shifter means 222 of each transmit subsystem $51_1$ to $51_8$ and $52_1$ to $52_8$, which shift the phase of the control signal 20 in accordance with this set of coefficients. The set of phase-shift coefficients $\Phi_{k,i}$ fixes the phase-shift to be effected by the phase-shifter means 222. The means 222 deliver the phase-shifted control signal to the multicarrier amplitude modulator means 225.

Similarly, means 224 are provided for allocating to each set $51_1$ to $51_8$ and $52_1$ to $52_8$ of transmit subsystems a set of amplitude coefficients $\rho_{k,i}$ where $\underline{k}$ is the number of the transmit subsystem in the separate set $\underline{i}$ of transmit subsystems $1 \leq k \leq N$ and $1 \leq i \leq P$, corresponding to a particular shape of the beam. The allocator means 224 deliver the set of amplitude coefficients $\rho_{k,i}$ to the multicarrier amplitude modulator means 225, for example. The means 225 amplitude modulate the phase-shifted control signal. The amplitude differences between the amplitude coefficients $\rho_{k,i}$ allocated to each transmit system $51_1$ to $51_8$ and $52_1$ to $52_8$ control the shape of the corresponding beams. This enables different power relations to be obtained between the control signal carrier and the traffic signal carriers in each subsystem. In this example a ratio of 8 is globally retained between the power of the carrier of the control signal and that of any of the traffic signals for the eight subsets of the two sets of transmit subsets $51_1$ to $51_8$ and $52_1$ to $52_8$ taken together.

The phase-shifter means 222 allocate to each transmit subsystem a relative phase-shift $\phi_{k,i}$ where $\underline{k}$ is the number of the transmit subsystem in the set $\underline{i}$ of transmit subsystems $1 \leq k \leq N$ and $1 \leq i \leq P$ to form a beam allowing for the topology of the antenna array used.

Each transmit subsystem $51_1$ to $51_8$ and $52_1$ to $52_8$ transmits the control signal on a carrier with a controlled amplitude $\rho_{k,i}$ a controlled phase-shift $\Phi_{k,i}$ and a controlled relative phase-shift $d\phi_{k,i}$. The sets of phase-shift coefficients $\Phi_{k,i}$ and amplitude coefficients $\rho_{k,i}$ are fixed and applied to each modulation of the control signal onto the carrier. These sets correspond in particular to an FIR spatial filter with complex coefficients as its parameters. Summing means $53_1$ to $53_8$ sum the signals from at least two transmit subsystems belonging to two different sets of transmit subsystems. It is advantageous for the same antenna downstream of each of the summing means $53_1$ to $53_8$ to contribute to the transmission of different beams.

The converter means 22 (see FIG. 2b) allocate the control signal on each subsystem $\underline{k}$ of the set $\underline{i}$ of transmit subsystems an amplitude coefficient $\rho_{k,i}$, a phase-shift $\Phi_{k,i}$ and a relative phase-shift $d\phi_{k,i}$, where $1 \leq k \leq (N=)8$ is the number of the subsystem in the set of transmit subsystems and $1 \leq i \leq (P=)2$ is the transmit subsystem set number.

To summarize, the second embodiment of the invention does not require any new means. Only the set of phase-shift coefficients $\Phi_{k,i}$ are modified compared to the creation of a traffic beam. Nevertheless, it is clear that the sets of amplitude and relative phase-shift coefficients can also be modified.

The multicarrier amplitude modulator means 225 (see FIG. 2b) deliver the phase-shifted and amplitude-modulated control signal to digital-to-analog converter means 23. The means 23 and the transmit mixer means 24, amplifier means 25 and antennas 26 have already been described for the first embodiment (see FIG. 2b).

Figure 5:
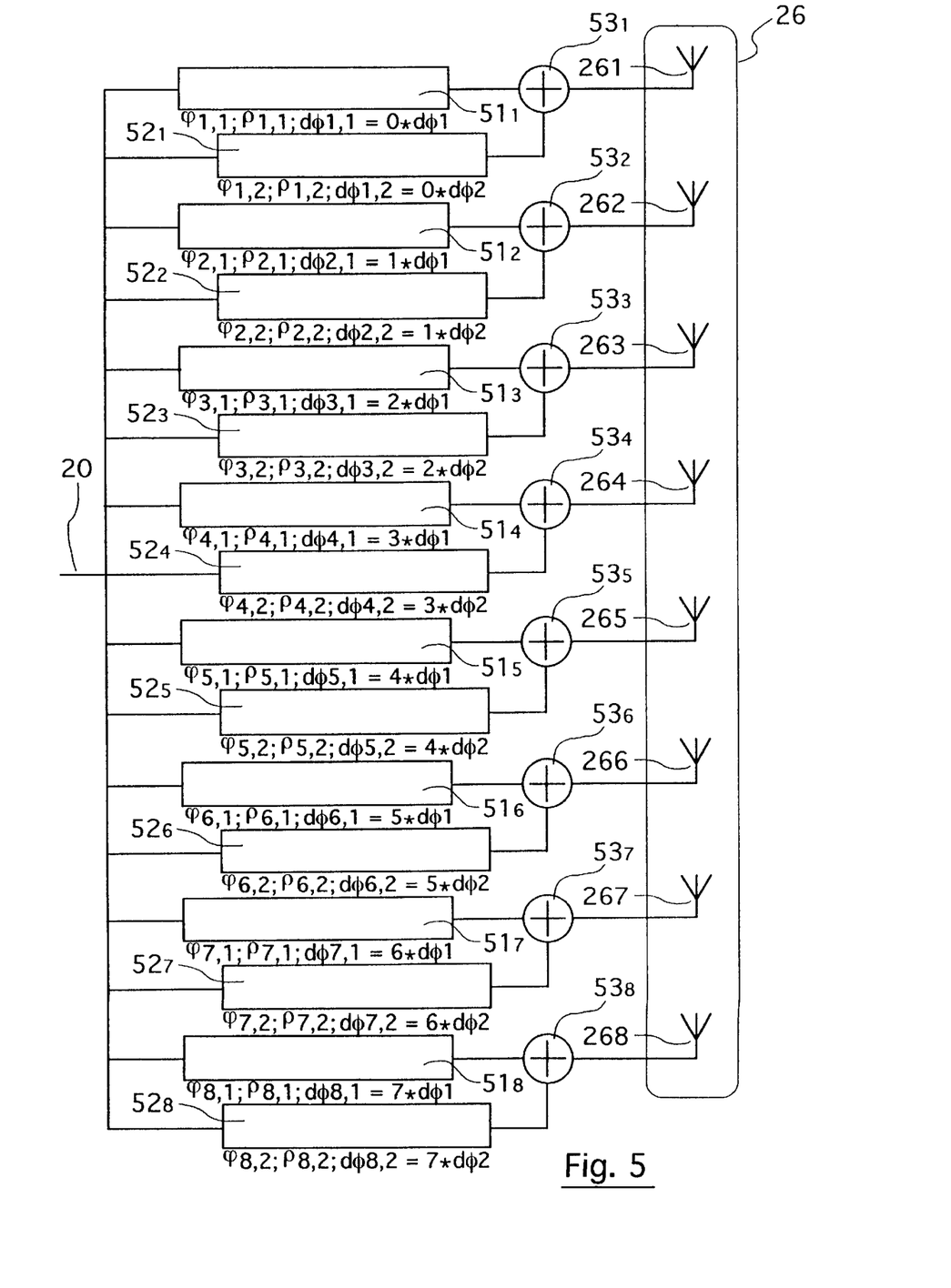
FIG. 5 is a simplified diagram of a particular second embodiment of a base station in accordance with the invention implementing the method of FIG. 4.
Figure 6:
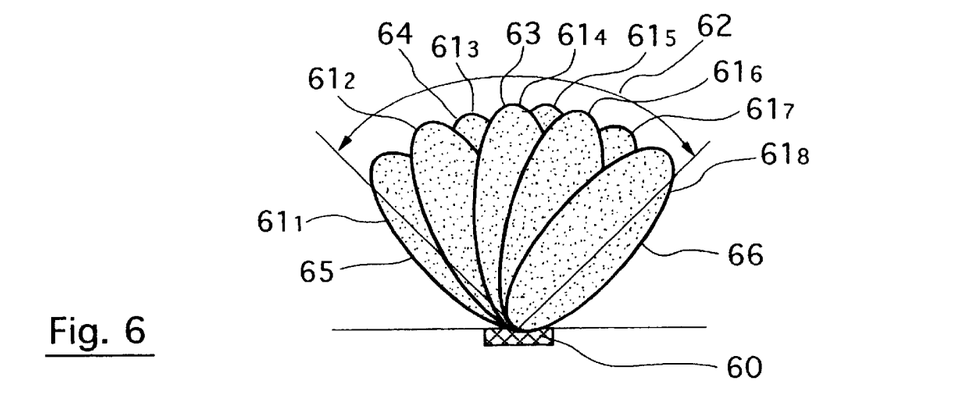
FIG. 6 is a simplified diagram of a set of superposed beams generated by the base station from FIG. 5.

Superposed beams created by the base station from FIG. 5 is described with reference to FIG. 6.

The array 60 of 8 antennas of the previous example simultaneously produces eight superposed beams $61_1$ to $61_8$ within the angular range 62 (i.e. between the extreme positions 65 and 66).

Each beam has a respective average direction and a power equal to the nominal power allocated to any traffic carrier.

In this way, the total coverage corresponding to the sum of the coverages of the superposed beams less the areas common to the superposed beams is equivalent to the coverage area of the angular range. In other words, the control signal is broadcast by the superposed beams in a substantially isotropic fashion.

A third embodiment of the method in accordance with the invention is described with reference to the FIG. 7 flowchart. This third embodiment corresponds to a combination of the first and second embodiments.

Like the first and second embodiments, the third embodiment of the method of the invention comprises a digital-to-analog conversion step 13, a transmit mixing step 14, an amplification step 15 and a transmit step 16. It further includes a processing step 70 in turn comprising:

an antenna set definition step 41, a step 42 in which a set of transmit subsystems is associated with each set of antennas, a step 43 in which each set of transmit subsystems is allocated a set of phase-shift coefficients and a respective conversion step 12 for each type of signal (cf. second embodiment); and a step 11 which allocates a time shift to the control signal, here for at least one set of transmit subsystems (cf. first embodiment).

Step 11 enables at least one of the sets of transmit subsystems to allocate a predetermined specific time shift to the control signal in one or more of the transmit subsystems of the set. In this way one or more of the superposed beams also vibrate about a respective angular direction. This angular direction corresponds to the average direction relative to the various angular positions assumed in succession by the vibrating beam.

Figure 7:
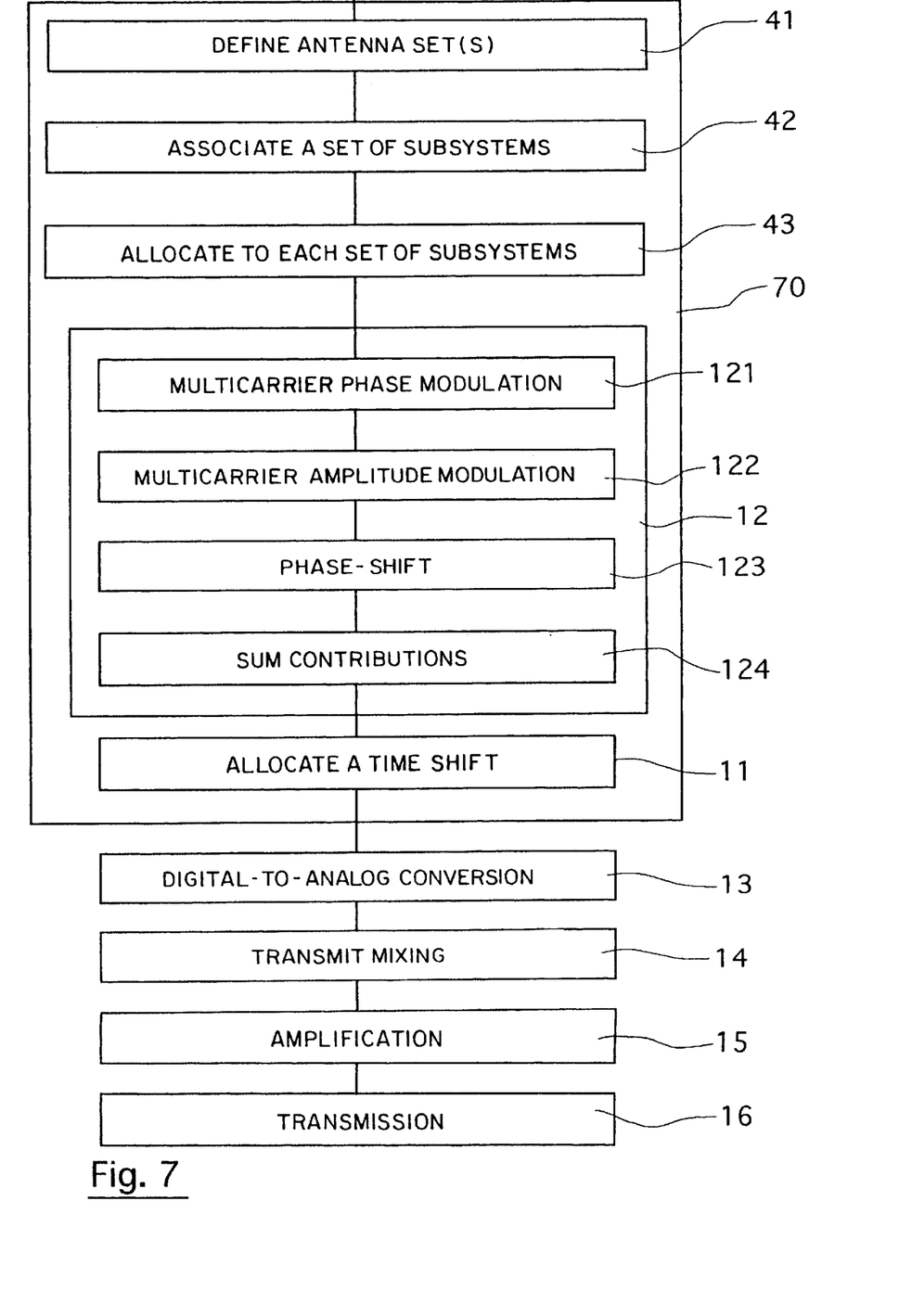
FIG. 7 is a simplified flowchart of a particular third embodiment of the method in accordance with the invention for transmitting a control signal by a base station of a mobile radio system.

A third embodiment of a base station in accordance with the invention using the method of FIG. 7 is described with reference to FIG. 8.

The base station comprises processor means 81, 82 and 83 each allocated to one beam. Each of the processor means 81, 82, 83 includes time shift allocator means 21 and converter means 22. The converter means 22 have already been described in detail in connection with the second embodiment of the invention.

Here the antenna array 261 to 268 is coplanar. Each subsystem $\underline{k}$ of the same set $\underline{i}$ of transmit subsystems is therefore subject to a phase-shift: $d\Phi_{k,i} = (k-1)^* d\Phi_i$, with $d\Phi_i = (2^*\pi^*\sin(\theta))/L$, $\theta$ being the required average angular direction for the vibrating beam, measured algebraically relative to the mid-perpendicular of the plane of the antenna array and L representing the wavelength corresponding to the center frequency used for the transmitted signal. In the example shown three superposed vibrating beams are generating.

The time shift allocator means 21 are fed with the control signal 20 and deliver the same signal 22b subject to a time shift $\Delta T_{k,i}$ to each transmit subsystem $\underline{k}$ associated with a set $\underline{i}$ of transmit subsystems. In the example shown, there is a basic time shift $\Delta T_i$ between transmit subsystems of the same set $\underline{i}$ of transmit subsystems such that $\Delta T_{k,i} = ((k-1)^* \Delta T_i)$.

In this way a first set 85 of four antennas 261 to 264 is associated with a first set 81 of four transmit subsystems 811 to 814 allocating to the control signal a time shift respectively equal to $0^*\Delta T_1$, $1^*\Delta T_1$, $2^*\Delta T_1$, $3^*\Delta T_1$. A second set 86 of four antennas 263 to 266 is associated with a second set 82 of four transmit subsystems 821 to 824 allocating to the control signal a time shift respectively equal to $0^*\Delta T_2$, $1^*\Delta T_2$, $2^*\Delta T_2$, $3^*\Delta T_2$. Finally, a third set 87 of four antennas 265 to 268 is associated with a third set 83 of four transmit subsystems 831 to 834 allocating to the control signal a time shift respectively equal to $0^*\Delta T_3$, $1^*\Delta T_3$, $2^*\Delta T_3$, $3^*\Delta T_3$.

Figure 9:
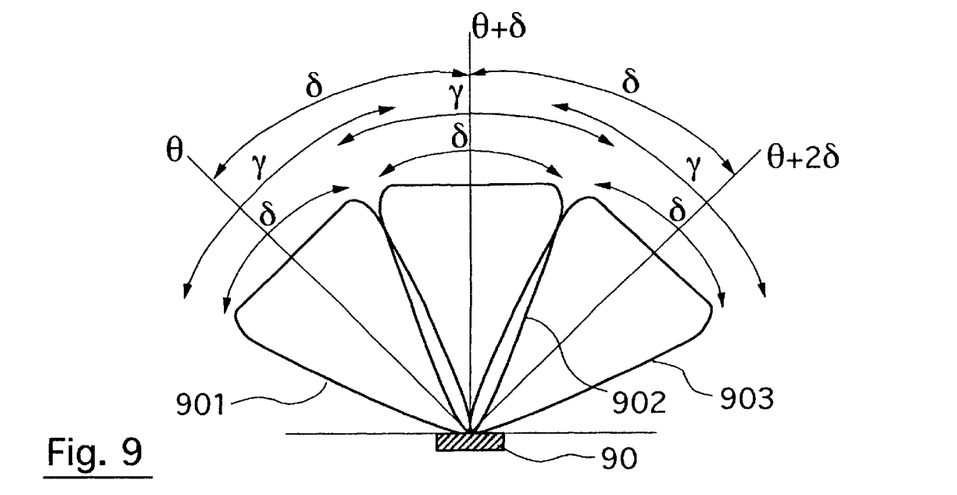
FIG. 9 is a simplified diagram of a set of superposed vibrating beams generated by the base station of FIG. 8.

Each of the three sets of transmit subsystems is associated with a separate vibrating beam (see FIG. 9 described hereinafter).

Note that the same antenna can belong to more than one set of antennas and therefore contribute to the transmission of different beams. For example, the antenna 263 belongs to the first and second sets of antennas and receives the signals from the transmit subsystems 813 and 821. Accordingly the transmitted control signal S(t) can be written in the following form:

$$S(t) = \text{modul}(BCCH(t-2^*\Delta T_1))^* \rho_{3,1} ^* e^{j\Phi_{3,1}} + \text{modul}(BCCH(t-0\Delta^*T_2))^* \rho_{1,2} ^* e^{j\Phi_{1,2}}.$$

The time shift allocator means 21 deliver the control signal to the converter means 22 after it has been time shifted, for example by an amount $\Delta T_{k,i} = ((k-1)^* \Delta T_i)$, where $\underline{k}$ is the number of transmit subsystem in the set $\underline{i}$ of transmit subsystems.

The converter means 22 (see FIG. 2b) allocate to the control signal on each subsystem $\underline{k}$ of the set $\underline{i}$ of transmit subsystems an amplitude coefficient $\rho_{k,i}$, a phase-shift coefficient $\Phi_{k,i}$ and a relative phase-shift $d\phi_{k,i}$, where $1 \leq k \leq (N=)3$ is the number of the subsystem in the set of transmit subsystems and $1 \leq i \leq (P=)4$ is the transmit subsystem set number. Allocation of the above sets has been described in more detail in connection with the second embodiment (see FIG. 5).

In this example the signals from the third transmit subsystem of the first set of transmit subsystems are added (via means 84) upstream of the third antenna to the signals from the first transmit system of the second set of transmit subsystems.

A base station conventionally comprises, for each transmit subsystem, converter means 22, digital-to-analog converter means 23, transmit mixer means 24, amplifier means 25 and antennas 26. These various means have already been described for the first embodiment (see FIG. 2b).

In this way, in the example shown, three superposed vibrating beams are obtained. The first vibrating beam is associated with the first set 81 of four transmit subsystems 811 to 814, which is allocated to the four antennas 261 to 264 of the first set 85 of antennas. The second superposed vibrating beam is associated with the second set 82 of four transmit subsystems 821 to 824, which is allocated to the four antennas 263 to 266 of the second set 86 of antennas. Finally, the third superposed vibrating beam is associated with the third set 83 of four transmit subsystems 831 to 834, which is allocated to the four antennas 265 to 268 of the third set 87 of antennas. These three beams therefore use three sets 81 to 83 of 4 transmit subsystems (811 to 814, 821 to 824, 831 to 834) and three sets 85 to 87 of 4 antennas (261 to 264, 263 to 266, 265 to 268). They are transmitted at the same frequency with different relative phases. These translate into average angular directions in which the three different beams point and widths such that the superposed beams occupy all of the angular range associated with the antenna array. In this way the control signal is broadcast isotropically.

Figure 8:
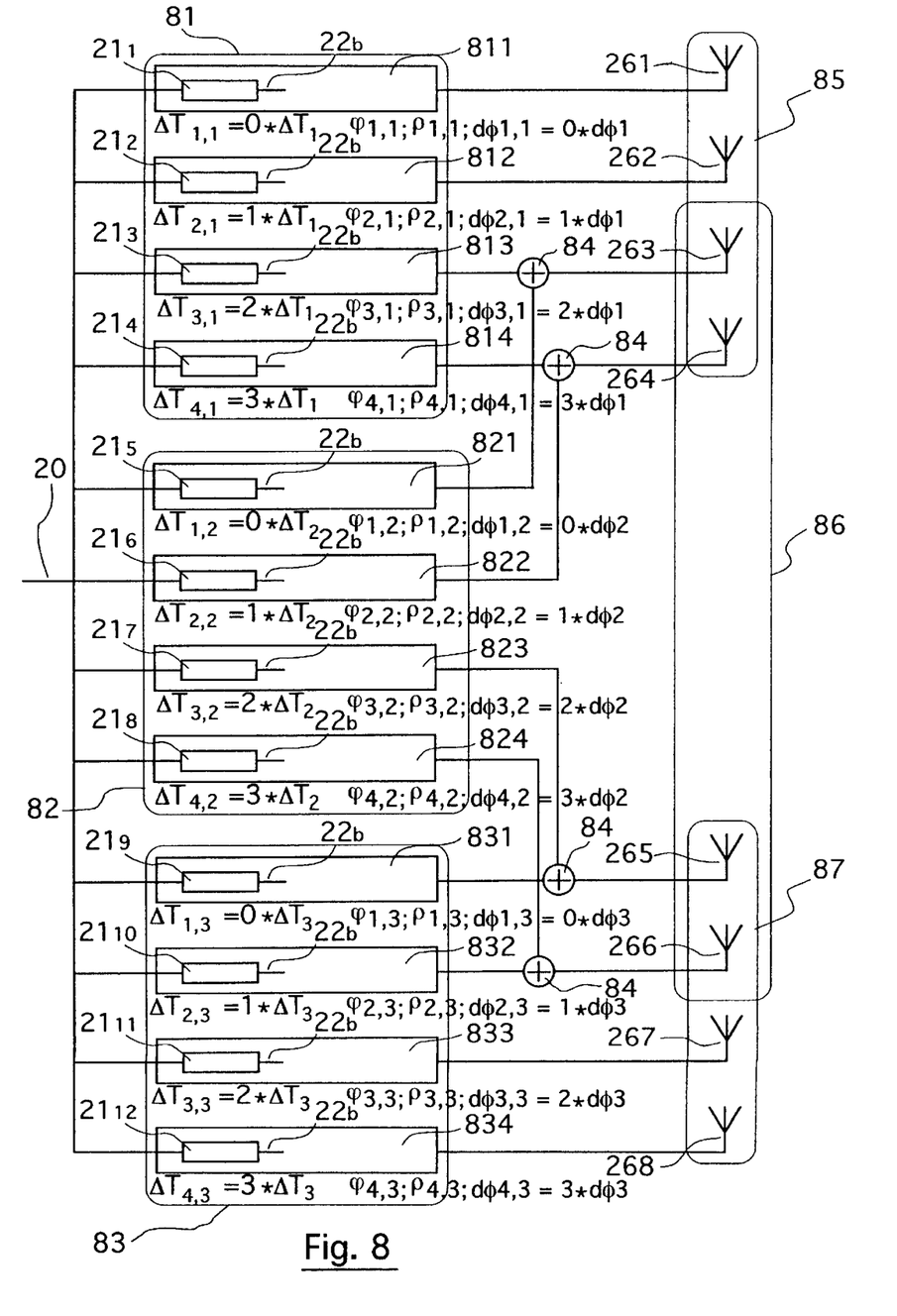
FIG. 8 is a simplified diagram of a particular third embodiment of a base station in accordance with the invention implementing the method of FIG. 7.

A simplified scheme with three superposed vibrating beams generated by the base station from FIG. 8 is described with reference to FIG. 9.

A first beam 901 points in an angular direction θ, for example, has a width δ and vibrates with an angular amplitude γ. A second beam 902 points in an average angular direction (θ+δ), for example, has a width δ and vibrates with an angular amplitude γ. A third beam 903 points in an average angular direction (θ+2*δ), for example, has a width δ and vibrates with an angular amplitude γ.

In this example these three beams therefore have the same width δ.

The angular amplitude γ of the vibration is the same for each beam. The basic shifts $\Delta T_i$ are assumed to be equal ($\Delta T_1 = \Delta T_2 = \Delta T_3 = \Delta T_i$) and correspond to a small time shift representing a fraction of the bit period of the phase modulation.

The set of phase-shift coefficients $\{\Phi_{1,1}$ to $\Phi_{4,1}\}$ corresponding to the first beam is such that the first beam points in the angular direction θ. The set of phase-shift coefficients $\{\Phi_{1,2}$ to $\Phi_{4,2}\}$ corresponding to the second beam is such that the second beam points in the average direction (θ+δ). Finally, the set of phase-shift coefficients $\{\Phi_{1,3}$ to $\Phi_{4,3}\}$ corresponding to the third beam is such that the third beam points in the average direction (θ+2*δ).

What is more, the three sets of amplitude coefficients $\{\rho_{1,1}$ to $\rho_{4,1}\}$, $\{\rho_{1,2}$ to $\rho_{4,2}\}$, $\{\rho_{1,3}$ to $\rho_{4,3}\}$ are such that the amplitude of the corresponding beams is equal to the radius of the cell. Accordingly, the three beams 901 to 903 cover all of the sector (120° in total).

What is claimed is:

1. A method of transmitting a control signal by a base station of a digital cellular mobile radio system, said base station comprising at least one array of a plurality of antennas (261 to 268) for dynamically creating a beam (31) transmitting said control signal, said transmit beam (31) being adapted to assume different angular positions (33) within a predetermined angular range (32), a plurality of transmit subsystems (201 to 208) being associated with said plurality of antennas (261 to 268), each transmit subsystem (201 to 208) including phase modulator means (221) and phase-shifter means (222), each antenna (261 to 268) transmitting a signal supplied by an associated one of said transmit subsystems (201 to 208) on the basis of said control signal and contributing to the creation of said beam (31), characterized in that said method includes the following step:

allocating (11) to said control signal, in at least one of said transmit subsystems, a predetermined specific time shift so that said transmit beam (31), called a vibrating beam (31), assumes in succession at least some (33) of said different angular positions and enables isotropic broadcasting of said control signal in said angular range (32).

2. A method according to claim 1, characterized in that the difference between two time shifts allocated to two transmit subsystems associated with two adjacent antennas (26) is equal to a basic time shift dT of predetermined fixed value.

3. A method according to claim 1, said beam (31) being created by N antennas (261 to 264) associated with N transmit subsystems (201 to 204), characterized in that each of said N transmit subsystems (201 to 204) is allocated one of a plurality of N time shifts uniformly distributed across a predetermined number n of bit periods.

4. A method according to claim 1, characterized in that each predetermined time shift specific to one of said transmit subsystems (201 to 204) is a predetermined fraction of a bit period.

5. A method according to claim 1, characterized in that said time shifts are distributed on both sides of a time reference specific to said base station.

6. A method according to claim 1, characterized in that said antenna array (261 to 268) belongs to the group comprising coplanar antenna arrays and non-coplanar antenna arrays.

7. A method according to claim 1, characterized in that said base station is of the type comprising at least two antenna arrays each covering a separate angular sector.

8. A method according to claim 7, each antenna array being of the coplanar type, characterized in that the antennas (261 to 268) of each array are equally spaced by a distance of less than half the wavelength at the maximum frequency used in the angular sector covered by said array.

9. A method according to claim 1, characterized in that said antenna array (261 to 268) is also used to transmit at least one traffic signal using a signal superposition and/or addition technique in at least some transmit subsystems (201 to 204).

10. A method according to claim 1, characterized in that said digital cellular mobile radio system belongs to the group comprising space-division multiple access systems and spatial filtering systems.

11. A method according to claim 1, characterized in that said control signal is a BCCH signal specific to said base station.

12. A method of transmitting a control signal by a base station of a digital cellular mobile radio system, said base station comprising at least one array of a plurality of antennas (261 to 268) for dynamically creating a beam (31) transmitting said control signal, said transmit beam (31) being adapted to assume different angular positions ($61_1$ to $61_8$) within a predetermined angular range (62), a plurality of transmit subsystems (201 to 208) being associated with said plurality of antennas (261 to 268), each transmit subsystem including phase modulator means (223) and phase-shifter means (222), each antenna transmitting a signal supplied by an associated one of said transmit subsystems (201 to 208) on the basis of said control signal and contributing to the creation of said beam ($61_1$), characterized in that said method comprises the following steps:

defining (41) at least two sets of antennas (261 to 268) from said plurality of antennas (261 to 268) of said array;

associating (42) a set of separate transmit subsystems ($51_1$ to $51_8$) with each set of antennas (261 to 268), one transmit subsystem per antenna; and     allocating (43) to each set of transmit subsystems ($51_1$ to $51_8$) a separate set of phase-shift coefficients corresponding to a particular angular position of said beam ($61_1$), each coefficient of said set defining the phase-shift effected by the phase-shifter means (222) of one of the transmit subsystems (201 to 208) of said set; so that each of said sets of antennas (261 to 268) dynamically creates a transmit beam (61) in a respective average angular direction, the superposed beams ($61_1$ to $61_8$) created by the various sets of antennas (261 to 268) having different phases.

13. A method according to claim 12, characterized in that said method further comprises the following step for at least one of said sets (81 to 83) of transmit subsystems:

allocating (11) to said control signal, in at least one of said transmit subsystems (811 to 814, 821 to 824, 831 to 834), a predetermined specific time shift so that said transmit beam (901), called a vibrating beam, created by the set of antennas (261 to 264) associated with said set (81) of transmit subsystems (811 to 814) assumes in succession at least some (33) of said different angular positions and enables isotropic broadcasting of said control signal around said angular direction specific to said vibrating beam (901).

14. A method according to claim 12, characterized in that the number of antennas (263 to 266) forming part of at least two separate sets (85 to 87) of antennas is minimized.

15. A method according to claim 12, characterized in that all the superposed beams (901 to 903) have substantially the same width (δ) and in that the average angular directions of two adjacent superposed beams are shifted substantially by said width (δ) of a beam (901).

16. Base station of a digital cellular mobile radio system, said base station comprising at least one array of a plurality of antennas (261 to 268) for dynamically creating a beam (31) transmitting said control signal, said transmit beam (31) being adapted to assume different angular positions (33) within a predetermined angular range (32), a plurality of transmit subsystems (201 to 208) being associated with said plurality of antennas (261 to 268), each transmit subsystem (201 to 208) including phase modulator means (223) and phase-shifter means (222), each antenna (261 to 268) transmitting a signal supplied by an associated one of said transmit subsystems (201 to 208) on the basis of said control signal and contributing to the creation of said beam (31), characterized in that said base station includes means (21) for allocating to said control signal, in at least one of said transmit subsystems (201 to 204), a predetermined specific time shift so that said transmit beam (31), called a vibrating beam (31), assumes in succession at least some of said different angular positions (33) and enables isotropic broadcasting of said control signal in said angular range (32).

17. Base station of a digital cellular mobile radio system, said base station comprising at least one array of a plurality of antennas (261 to 268) for dynamically creating a beam ($61_1$) transmitting said control signal, said transmit beam ($61_1$) being adapted to assume different angular positions ($61_1$ to $61_8$) within a predetermined angular range (62), a plurality of transmit subsystems (201 to 208) being associated with said plurality of antennas (261 to 268), each transmit subsystem (201 to 208) including phase modulator means (223) and phase-shifter means (222), each antenna (261 to 268) transmitting a signal supplied by an associated one of said transmit subsystems (201 to 208) on the basis of said control signal and contributing to the creation of said beam (61), characterized in that said base station comprises:

at least two sets of antennas (261 to 268) from said plurality of antennas (261 to 268) of said array;

at least two separate transmit subsystems ($51_1$ to $51_8$) each associated with one of said sets of antennas (261 to 268), one transmit subsystem per antenna; and     means (51) for allocating to each set of transmit subsystems a separate set of phase-shift coefficients corresponding to a particular angular position of said beam ($61_1$), each coefficient of said set defining the phase-shift effected by the phase-shifter means (221) of one of the transmit subsystems (201 to 208) of said set; so that each of said sets of antennas (261 to 268) dynamically creates a transmit beam ($61_1$) in a respective average angular direction, the superposed beams ($61_1$ to $61_8$) created by the various sets of antennas (261 to 268) having different phases.

\* \* \* \* \*